Figure 1:
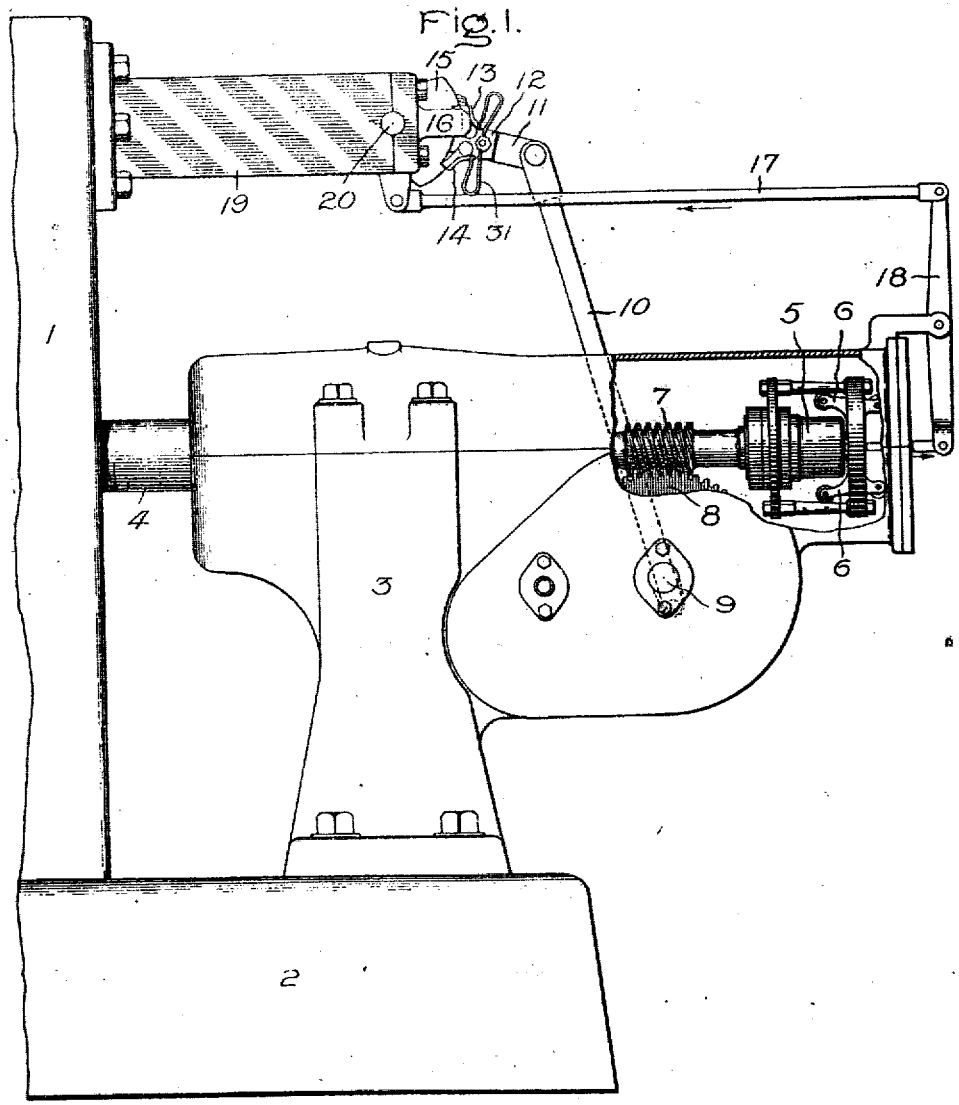

No. 815,742. PATENTED MAR. 20, 1906.
R. H. RICE.
GOVERNING MECHANISM FOR TURBINES.
APPLICATION FILED DEC. 9, 1904.

10 SHEETS—SHEET 1.

Witnesses:
Helen Orford
Alex. F. Macdonald.

Inventor,
Richard H. Rice,
By Albert G. Davis
Atty.

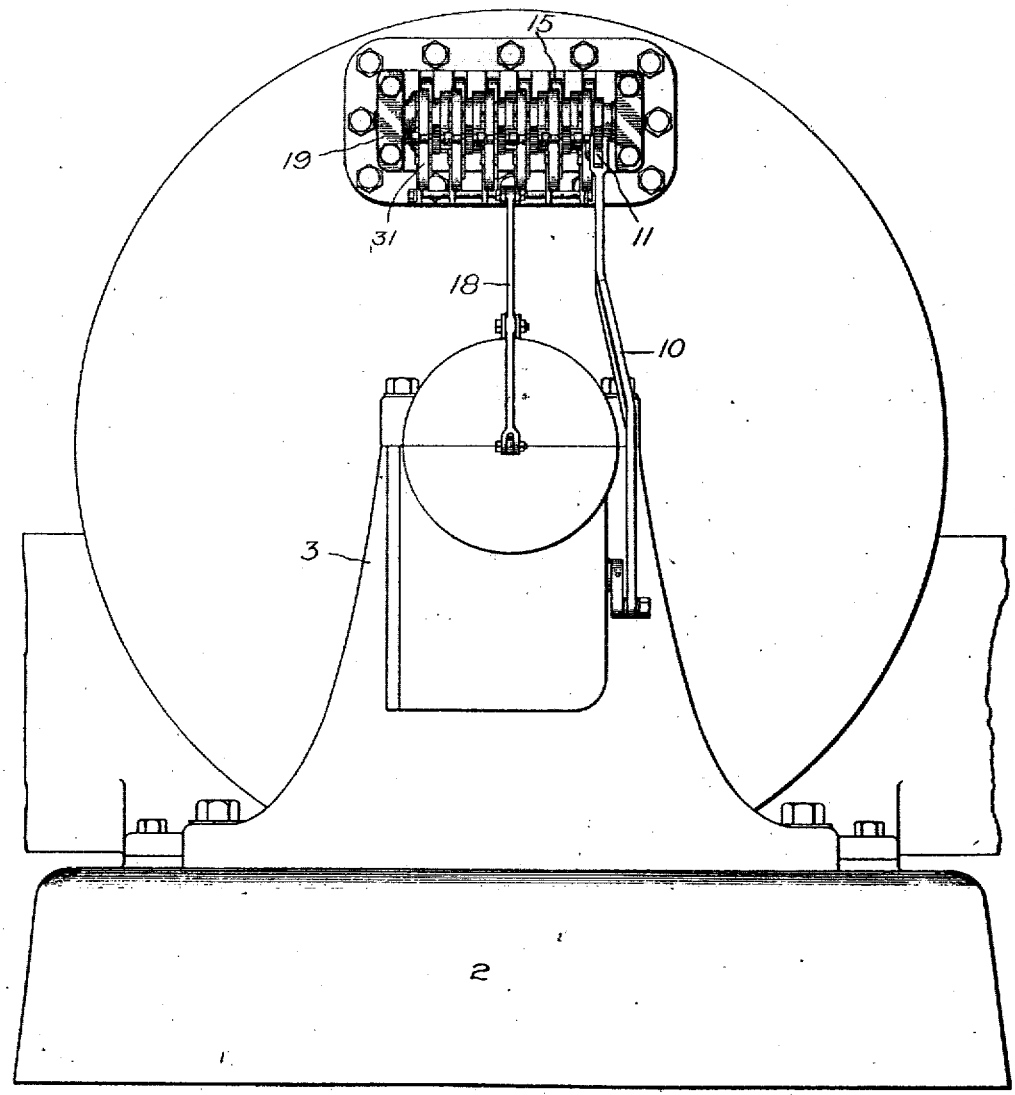

No. 815,742. PATENTED MAR. 20, 1906.
R. H. RICE.
GOVERNING MECHANISM FOR TURBINES.
APPLICATION FILED DEC. 9, 1904.
10 SHEETS—SHEET 3.
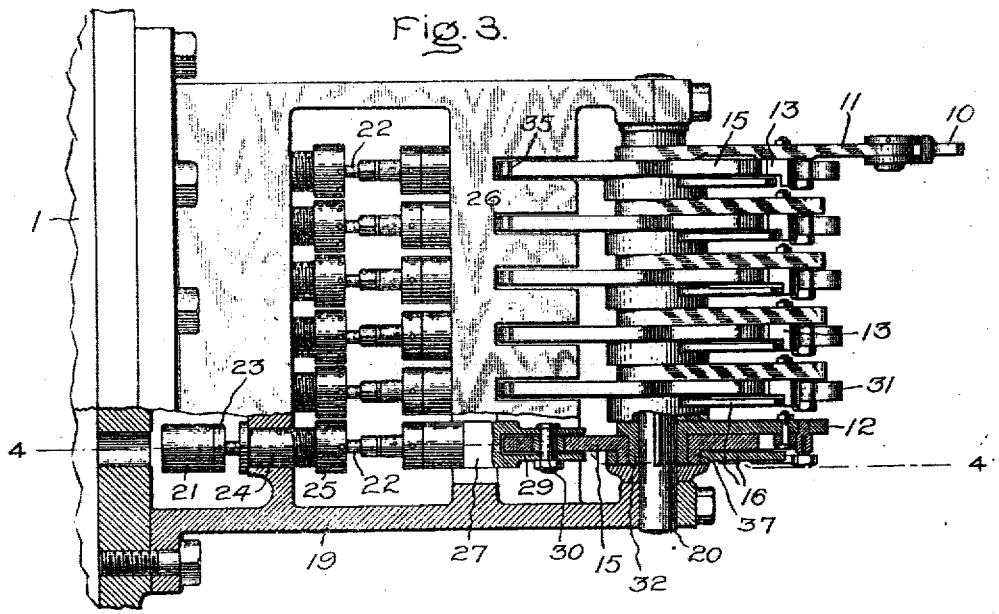
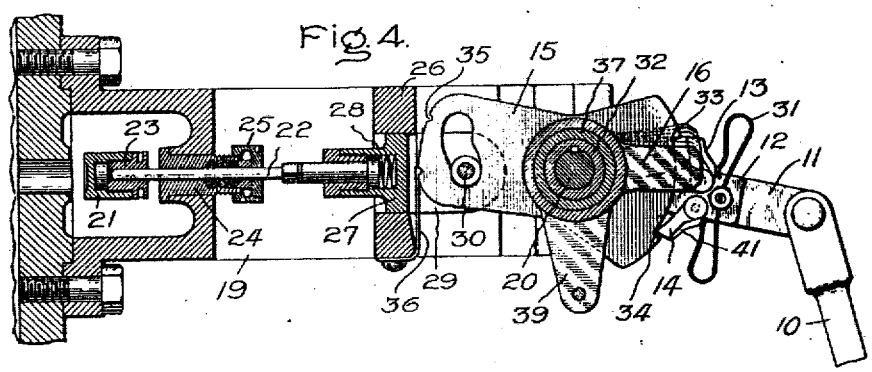
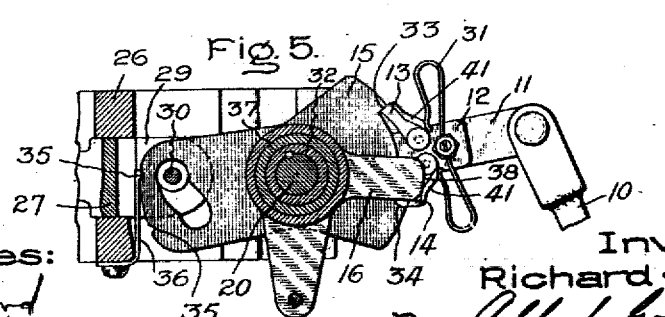
Witnesses:
Helen Oxford
Alex F. Macdonald
Inventor,
Richard H. Rice,
By Albert G. Davis
Att'y.

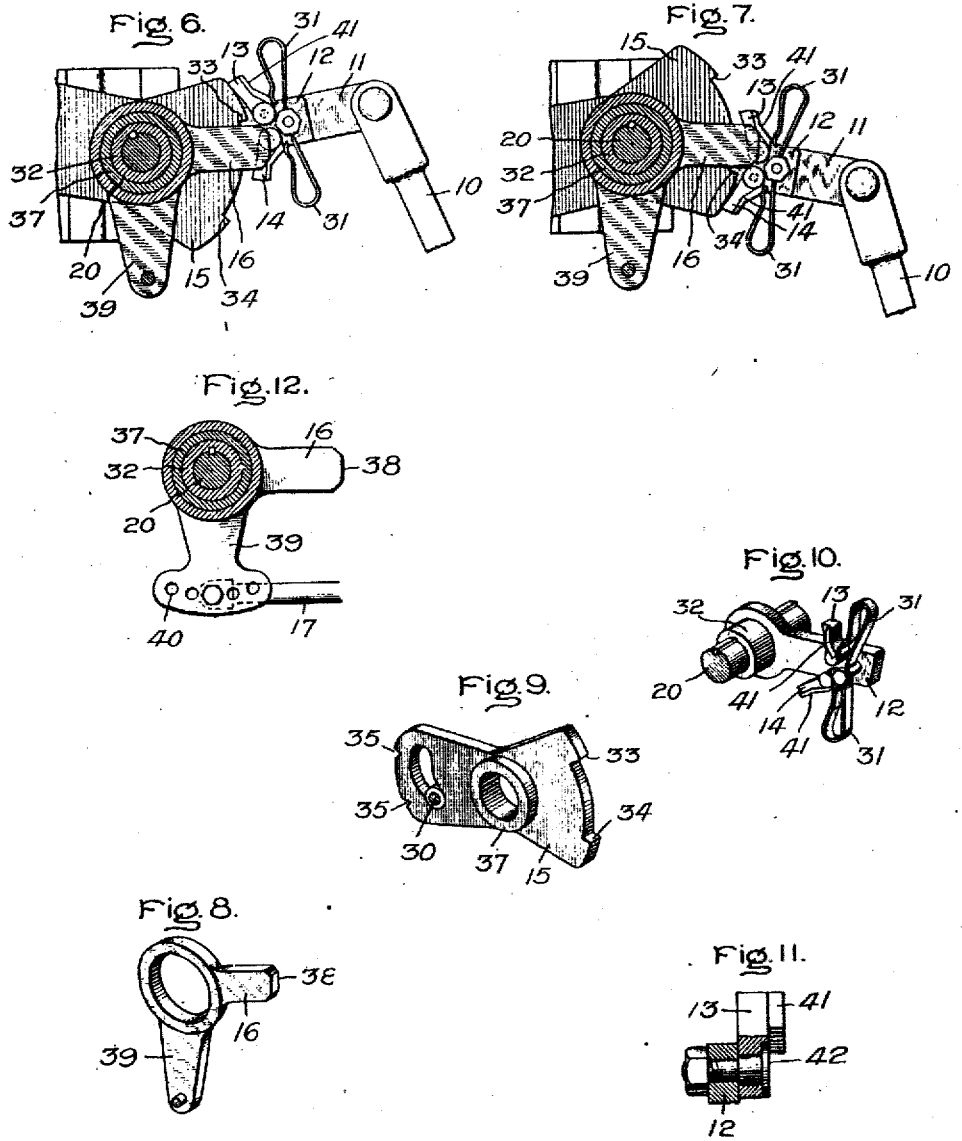

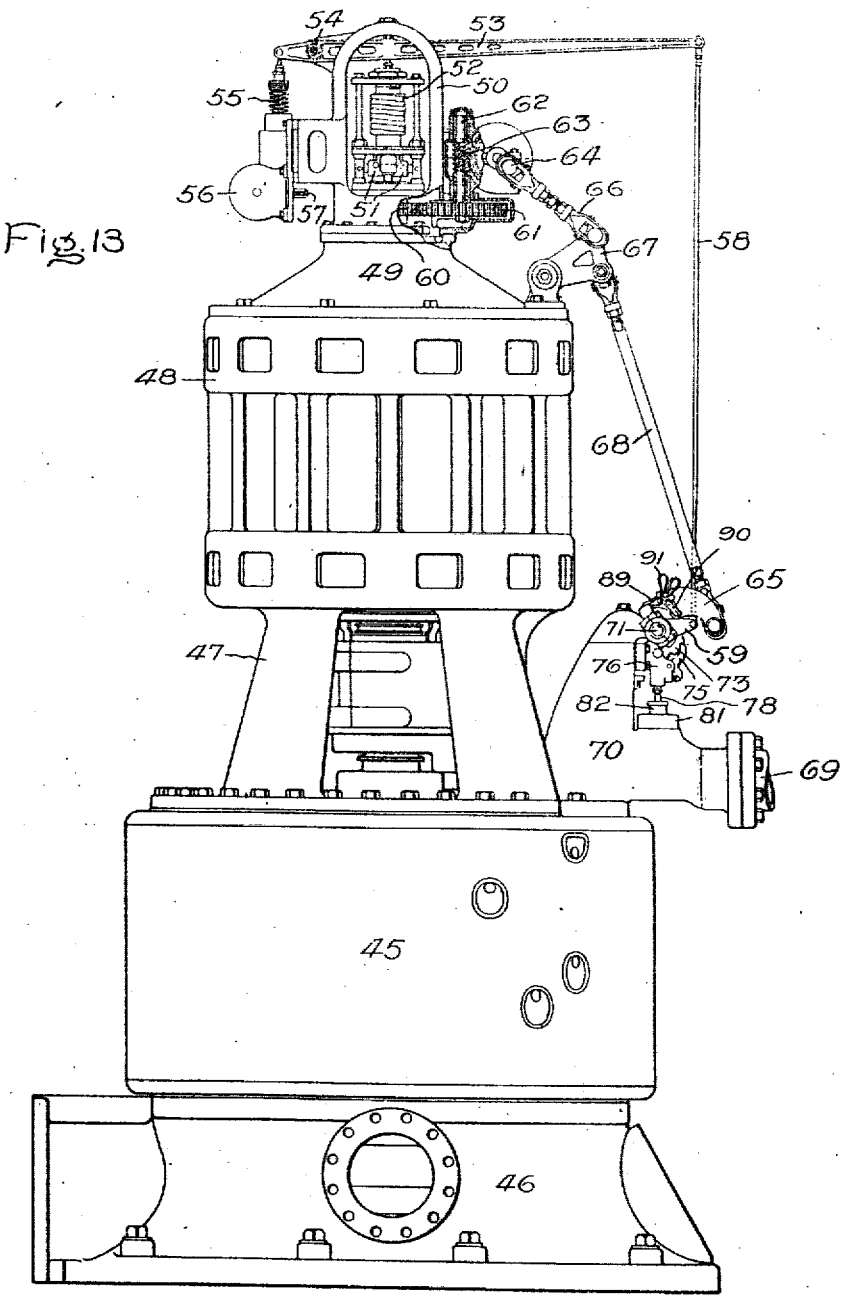

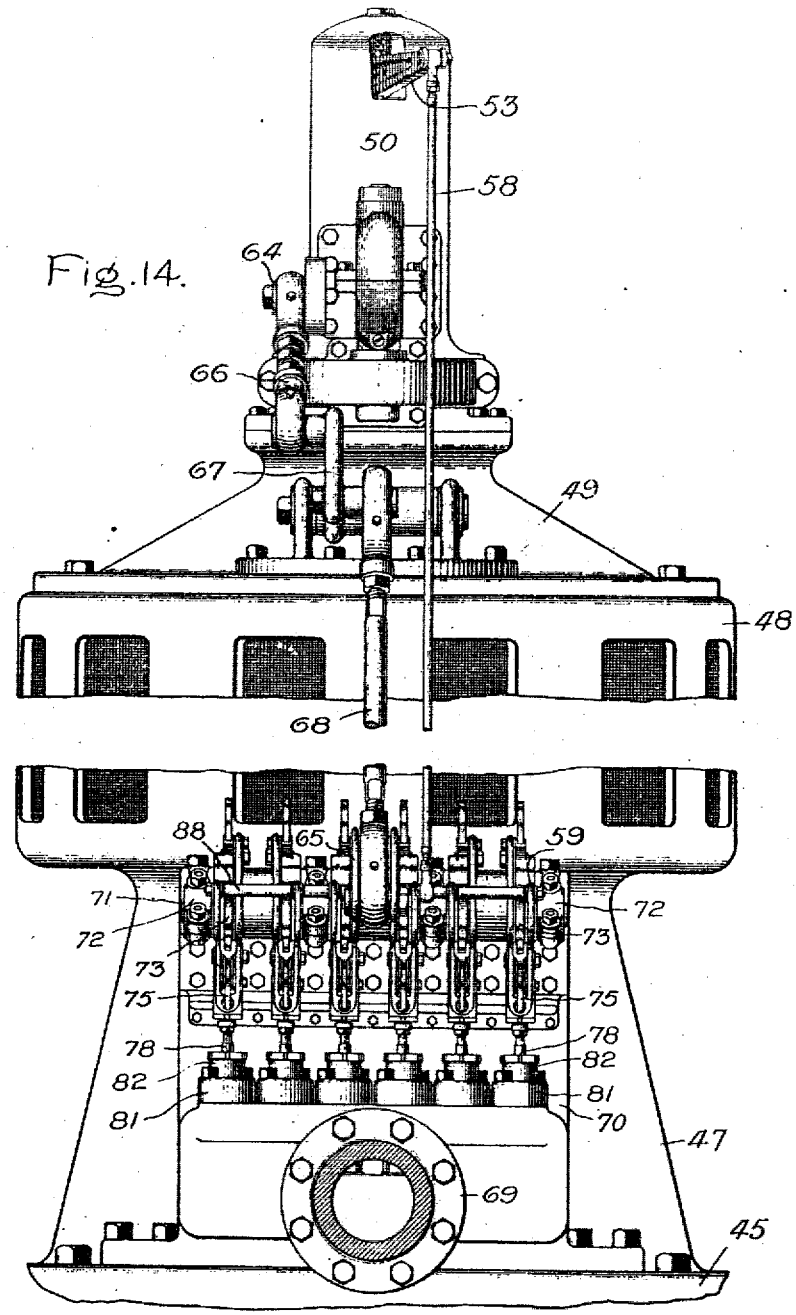

Witnesses:
Helen Orford
Alex F. Macdonald

Inventor,
Richard H. Rice,
By Albert G. Davis
Atty.

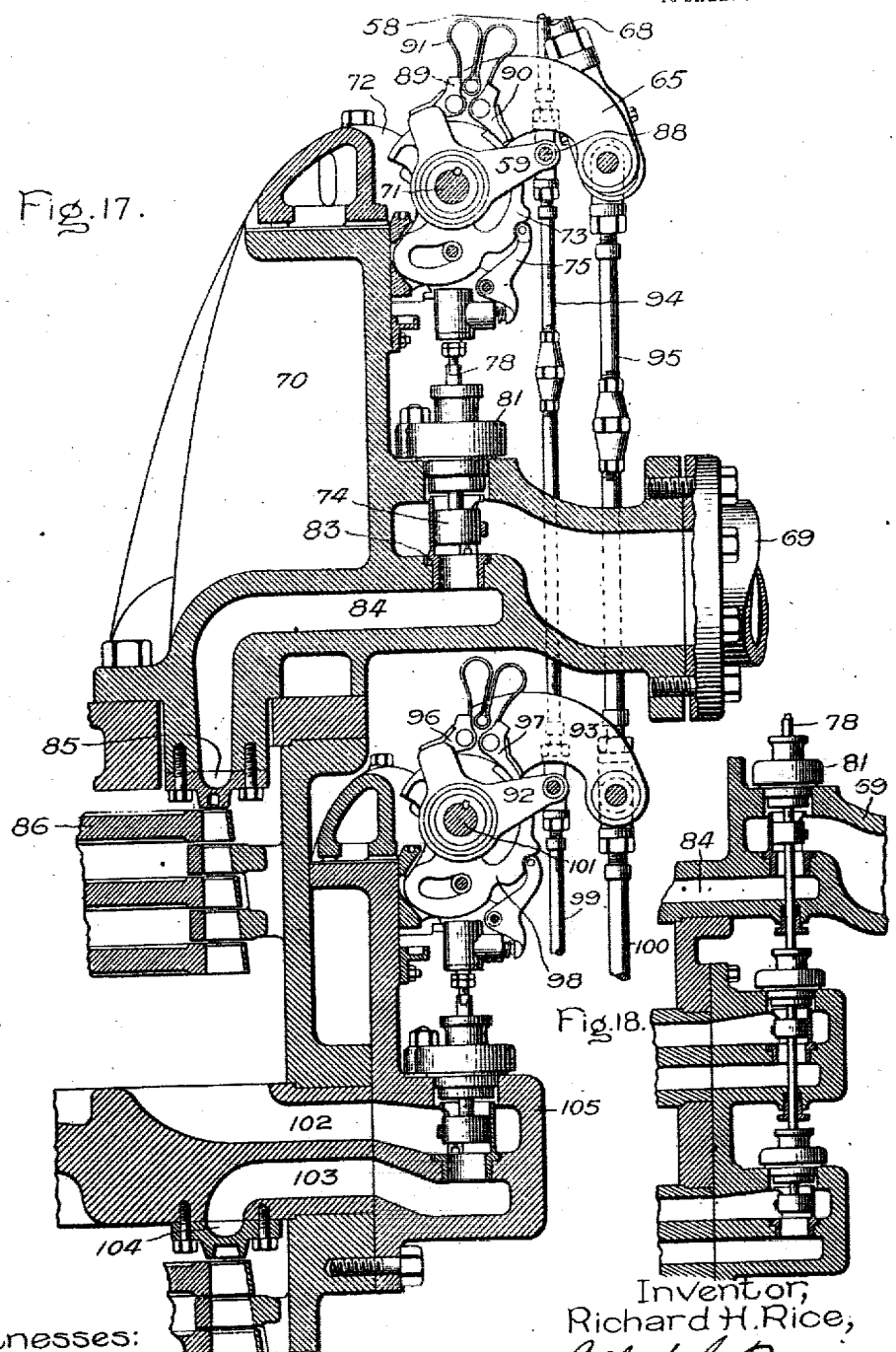

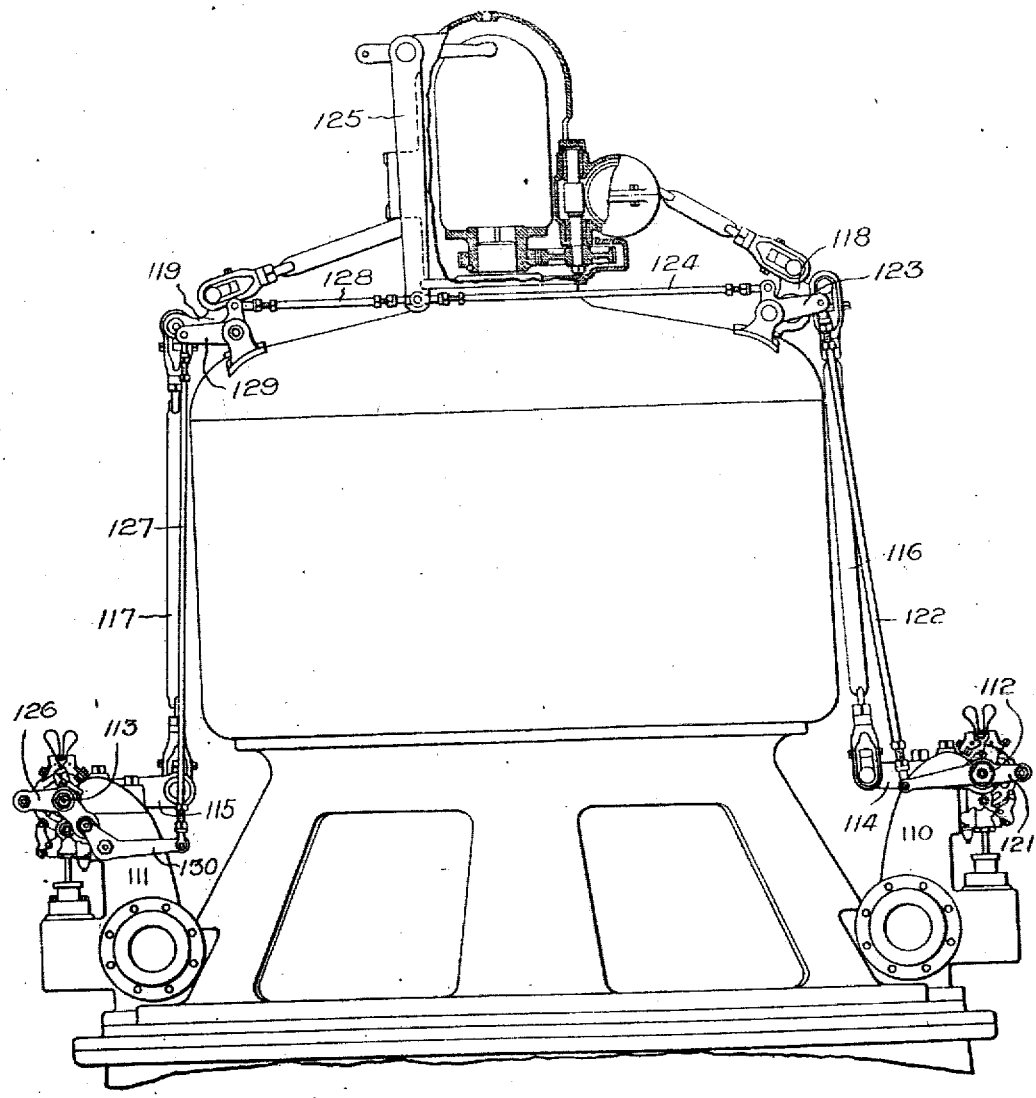

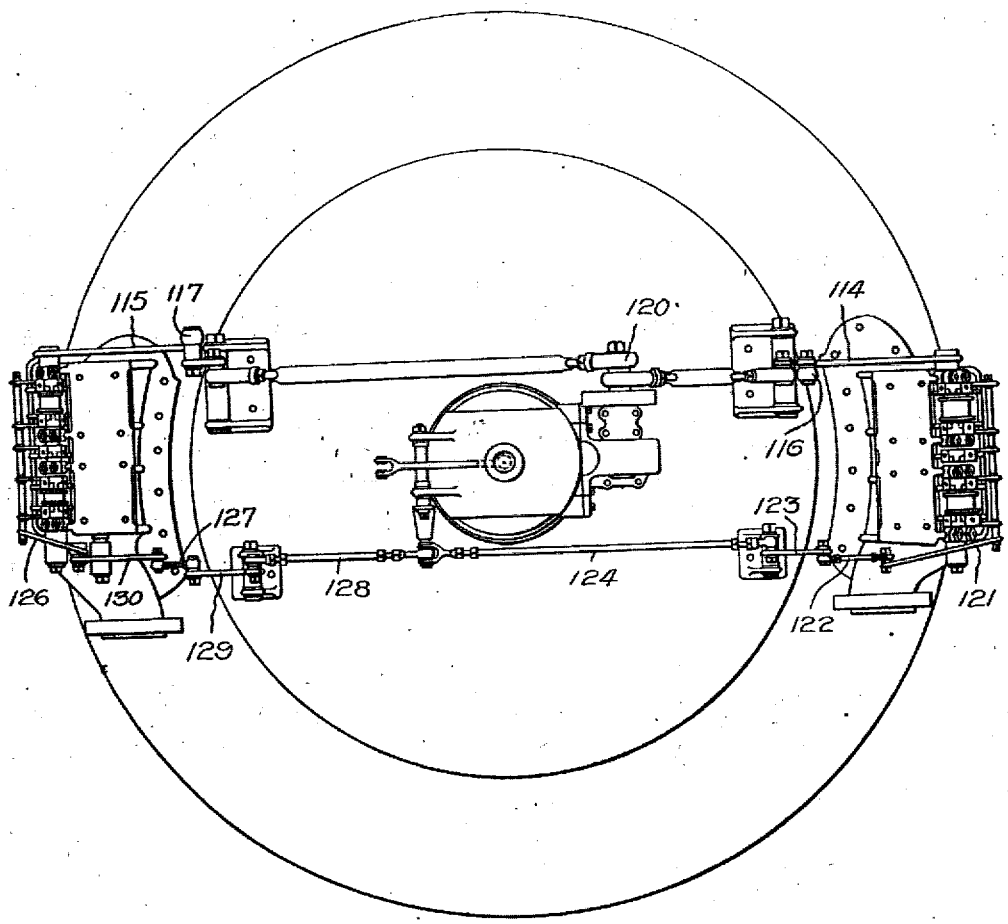

UNITED STATES PATENT OFFICE.

RICHARD H. RICE, OF LYNN, MASSACHUSETTS, ASSIGNOR TO GENERAL ELECTRIC COMPANY, A CORPORATION OF NEW YORK.

GOVERNING MECHANISM FOR TURBINES.

No. 815,742.      Specification of Letters Patent.      Patented March 20, 1906.

Application filed December 9, 1904. Serial No. 236,099.

*To all whom it may concern:*

Be it known that I, RICHARD H. RICE, a citizen of the United States, residing at Lynn, in the county of Essex and State of Massachusetts, have invented certain new and useful Improvements in Governing Mechanism for Turbines, of which the following is a specification.

The present invention has for its object to improve the construction of governing mechanism for turbines, and more especially those of the elastic-fluid type.

In carrying out my invention one or more valves are provided for controlling the admission of steam or other elastic fluid to the bucket wheel or wheels. These valves may be arranged to control the admission of motive fluid to the first wheel, or they may be employed to control the admission of motive fluid to the wheels of successive stages after the first, or both. Where the succeeding stages are valved, the same or a different mechanism may be employed to actuate them. I prefer, however, to use the same type of mechanism for actuating the one or more stage-valves as is employed for actuating the valves of original admission. Under ordinary conditions they would be under the control of a single speed-responsive device or a device responsive to changes in load.

As many valves are provided as are necessary to efficiently govern the turbine. These valves are usually independently and successively actuated; but two or more may be actuated simultaneously if it is desired to meet a special condition. Each valve or group of valves when two or more are operating together either in the same or different stages is actuated by a motor which has a reciprocating or to-and-fro motion. The motor or motors is or are driven from the main shaft of the turbine, and practically unlimited power is thus available for overcoming any tendency of the valves to stick or be held in a given position from any cause. Each motor may have its own connection with the source of power, or the various motors may receive motion from the same driving connection. The latter arrangement is preferable on account of simplicity.

The motors may reciprocate or move to and fro in a straight line, or they may reciprocate or move to and fro in the arc of a circle. I may without departing from my invention use a motor or motors for actuating the valves which is or are independent of the turbine. It is preferable, however, to operate direct from the turbine-shaft on account of its simplicity. Since the motors are continuously operating, it is necessary to provide a means for connecting and disconnecting them from the valves. In other words, means must be provided to cause each motor to take up its work when it is necessary to open or close a valve and to disconnect it from its work when the valve or valves are to be held open or closed. In this way the total work required of the motors is small, for some of the valves will usually be open, some closed, and one valve opening and closing to do the regulating. The means for causing this connecting and disconnecting is under the control of a suitable governor, usually a speed-responsive device. By reason of this arrangement the work required of the governor is small, which is conducive to good regulation.

The length of stroke of each motor is generally about the same as that of the device or part which actuates the valve; but it can be longer, if desired. Each valve is, by preference, fully opened or closed by one stroke of the motor; but the apparatus can be modified to the extent of requiring two or more strokes, if desired.

I may arrange all of the valves for a given stage in one or more groups. When arranged in two or more groups, the motors employed to actuate the valves preferably, but not necessarily, derive their energy from the same source. The shield-plates or other devices for controlling the action of the motors on the valves should be moved by the same governor. The valves in one group may be arranged to open or close in a predetermined manner either before or after the opening and closing of the valves in another group. On the other hand, one valve in a given group may open or close, then a valve in another group, and so on. More specifically, each valve is provided with a stem which extends through a suitable packing in the valve-chest and is actuated by a cam-plate, the action of one cam-plate being independent of the action of every other cam-plate. Between each cam-plate and its valve is a yielding means, which compensates for unequal expansion of the parts and also for the lack of alinement. The cam or cams, as the case may be, is or are loosely mounted upon a rock-shaft, the latter being constantly operated by the turbine-shaft or by a mechanism driven thereby. The connection between the rock-shaft and the turbine-shaft is of such a character that practically an unlimited amount of energy is available for positively opening or closing a valve. Situated adjacent to each cam and mounted upon the rock-shaft is a motor or steam lever provided with two spring-pressed dogs that are arranged to alternately engage with two projections formed on the cam-plate. When one of these dogs engages with a projection, the valve is opened, and when the other dog engages with another projection the valve is closed. In other words, one dog rocks the cam-plate in one direction to open the valve, and the other dog rocks the cam-plate in the opposite direction to close the valve. The valves, cams, motors, and driving connection are preferably, of such character that the valves are either opened or closed by a given stroke and have no intermediate or throttling position. The dogs are under the control of a speed-responsive device. In the preferred form of my invention shield-plates are provided, which are so constructed and arranged with respect to the dog carried by each steam-lever that each plate will permit one dog or the other to engage and actuate the cam-plate, or it may hold both of the dogs out of engagement when in a neutral position, in which case the rocking of the lever has no effect upon the cam and valve actuated thereby. Where more than a single valve is employed, the shield-plates are adjusted so that the valves are successively operated. The mechanism for operating each valve is the counterpart of the mechanism for operating every other valve. Obviously the construction is one in which the number of valves can be increased or diminished at will, and since the parts are all counterparts spare parts can be kept in stock. If anything happens to one of the valves, the dogs can be moved to a position where they have no effect upon the action of the valve, in which case the remaining valves will perform their work in the usual manner. This I consider to be an important feature of the invention, inasmuch as it avoids shutting down the turbine in case of trouble. I also consider the feature of positively opening and closing a valve by a source of practically unlimited power to be a very great advantage, since it prevents the sticking of one or more valves either in an open or closed position or in an intermediate position. Furthermore, the arrangement of the parts is such that the position of the cam indicates at once to the observer whether the valve is in the open or closed position.

The invention may be applied to horizontal or vertical turbines, as desired, the essential features of the construction being the same in both cases. Locking means are provided for holding the cam-plate in both of its positions to prevent accidental movement.

Figure 15:
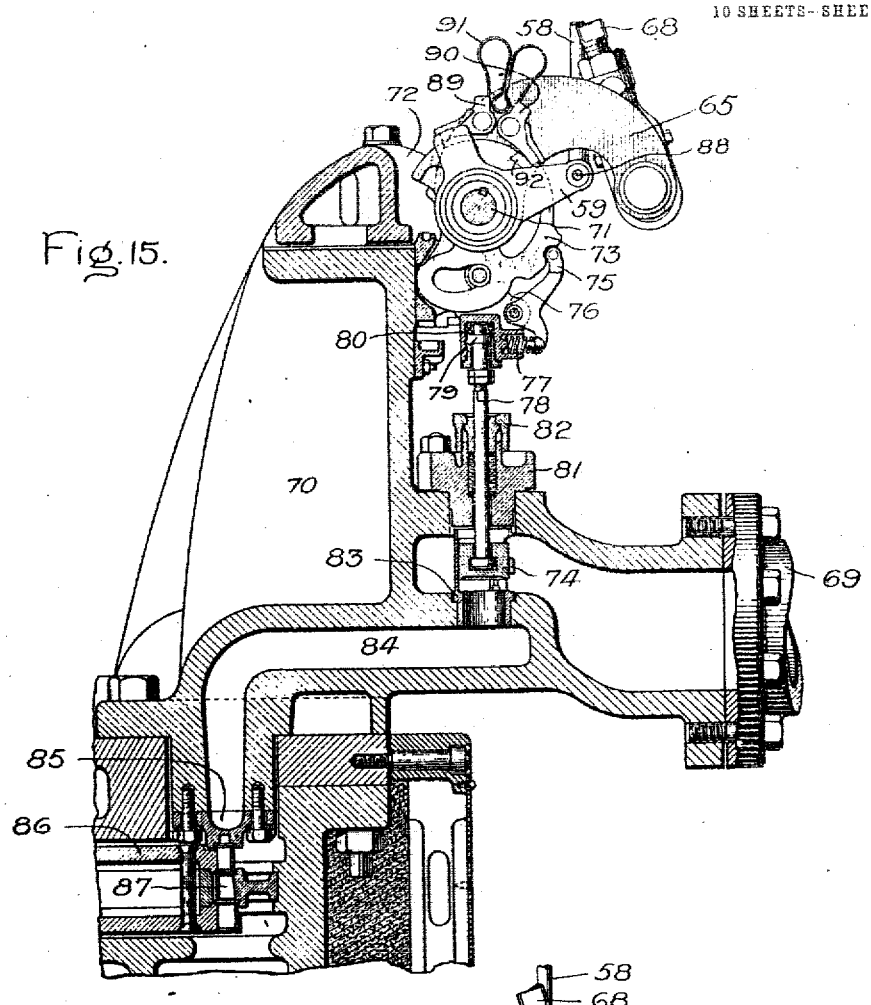
Figure 16:
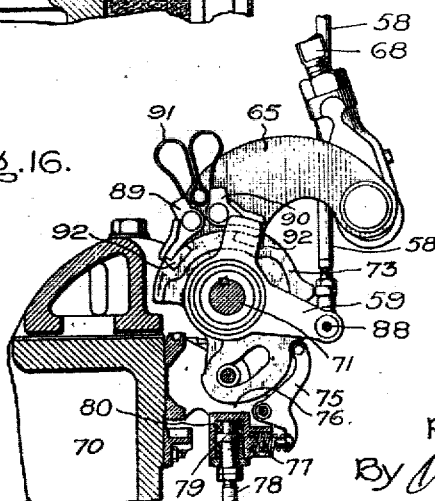

In the accompanying drawings, which illustrate certain embodiments of my invention, Figure 1 is a side view of a portion of a horizontal turbine equipped with my improved governing mechanism. Fig. 2 is an end view of the same. Fig. 3 is a plan view of the valve-actuating mechanism. Fig. 4 is a sectional view taken on line 4 4 of Fig. 3. Fig. 5 is a sectional detail view showing the cam-plate and other parts in the extreme position, the nozzle-valve having just been closed. Fig. 6 is a detail view showing the nozzle-valve closed and the dogs in such position that no movement of the nozzle-valve will take place. Fig. 7 is a sectional detail view showing the nozzle-valve open and the parts in such relation that the dogs will not close the nozzle-valve. Fig. 8 is a perspective view of a shield-plate which is connected to the speed-responsive device. Fig. 9 is a perspective view of a cam for actuating a valve. Fig. 10 is a perspective view of the steam-lever which carries the cam-plate and actuating-dogs. Fig. 11 is a detail view showing the stud for connecting the dogs to the steam-lever. Fig. 12 is a detail view showing a means whereby the shield-plates may be adjustably connected to the speed-responsive device for the purpose of changing the point of operation of the dogs. Fig. 13 is a view in side elevation of a vertical turbine equipped with my improved governor. Fig. 14 is a view of the same at right angles and on a somewhat-enlarged scale, the turbine being broken away for convenience. Fig. 15 is a detail sectional view, on an enlarged scale, of the valve-chest and mechanism for actuating the valves. Fig. 16 is a view of the valve-actuating mechanism shown in the opposite position to that of Fig. 15. Fig. 17 is a sectional view of a turbine provided with admission and stage valves actuated by my improved mechanism. Fig. 18 is a detail view in section, showing a number of valves connected together and operated by the same mechanism. Fig. 19 is a detail view in elevation, showing means for operating valves when arranged in separate groups; and Fig. 20 is a plan view of the same.

1 represents a horizontal turbine of any suitable construction, the one shown being of the Curtis type. The machine is mounted on a base 2, that also carries the shaft-bearings 3, only one of which is shown. The revolving part of the turbine is mounted on the main shaft 4, and to one end thereof is secured the speed-responsive device 5, comprising weights 6, opposed by a spring located within the barrel of the governor. On the main shaft is a worm 7, that meshes with a worm-wheel 8, the shaft of the latter being supported in suitable bearings carried by an inclosing casing, the latter being formed integral with or secured to the bearing 3. On the shaft 9, that supports the gear, is a crank (shown in dotted lines, Fig. 1, full line, Fig. 2,) and attached thereto is a connecting-rod 10 for imparting movement, by means of the lever 11 and a rock-shaft, to the steam-levers or motors 12 and the pivoted dogs 13 and 14, carried thereby. These dogs are adapted to engage with projections on the cam-plate 15. When the dog 13 drops into engagement with a projection on the cam-plate, it moves it in one direction, and when the dog 14 drops into engagement with the other projection it moves the cam-plate in the opposite direction. These dogs are controlled by the pivoted shield-plate 16, the latter being in the form of a bell-crank lever connected by the rod 17 and lever 18 with the speed-responsive device 5. The essential function of these shield-plates is to control the dogs, and obviously the manner of doing this can be varied without departing from my invention. The form and mode of operation of the dogs can also be varied.

From the foregoing it will be seen that all the work of moving the valves and cam-plates is done by the main shaft 4 of the turbine through the gearing and connecting-rod 10 and motors or steam-levers. By preference gearing is interposed between the turbine-shaft and the steam-lever 12 to reduce the strokes per minute to a conservative number; but under certain conditions it is possible to actuate the steam lever or levers without the interposition of reducing-gearing. The valves and valve-actuating mechanism are carried by a chest 19, that is bolted to the turbine-casing. The cam plate or plates, the steam lever or levers, and the shield plate or plates are mounted upon a rock-shaft or spindle 20, that is carried by the chest 19. This is the preferable arrangement of parts; but under certain conditions the parts may be otherwise mounted in place.

Referring to Figs. 3 and 4; the construction of the parts will be more clearly seen. Each of the valves 21 is similar in construction to every other valve. Each valve may control the passage of steam or other motive fluid to a single nozzle or to a group composed of two or more nozzles. On the other hand, some of the nozzles may control only a single nozzle-section, while others may control two or more nozzle-sections. Each valve is provided with a stem 22, having an enlarged head on its inner end that is located within the valve 21. The head is secured in place by an internal nut 23. The valve-stem passes through a sleeve 24, the outer end of which is provided with a packing and an adjustable gland 25 to prevent the escape of motive fluid at this point. Extending parallel with the casing of the turbine and forming a part of the chest 19 is a rib 26, having as many openings as there are valves. Located in each of these openings is a cross-head 27. The cross-head is bored out on the side adjacent to the valve to receive an enlarged head formed on or attached to the valve-stem. Between the head and the bottom of the bore is a compression-spring 28, which serves to compensate for unequal expansion of the parts and also for any inaccuracy in construction. In other words, if the parts when assembled should tend to move the valve 21 too much or too little, the spring 28 will compensate for this inaccuracy. The spring also assists in seating the valve. Formed on the cross-head is a fork 29, in which is mounted the pin 30, the latter being surrounded by an antifriction-roller and located in the cam-slot in the cam-plate 15. The shape of the cam-slot is such that a very short movement of the cam-plate will either open or close the valve and prevent the same from throttling the admission of steam.

Referring to Figs. 8, 9, and 10, the mechanism employed to operate the valve will be readily understood. 20 represents a rock-shaft which is mounted in the chest 19 and is continually rocked by the lever 11. This shaft is provided with a key that extends from one of its bearings to the other, but does not interfere with its rocking motion. Mounted upon this shaft and keyed thereto are as many steam-levers as there are valves to be actuated. Each one of the levers is provided with dogs 13 and 14, which are normally pressed toward the cam-plate by a spring or springs 31. In the present instance a single spring is provided, which acts upon both dogs; but separate springs may be employed, if desired. When for any reason it is desired to cut out one valve, the ends of the spring 31 can be placed under the dogs 13 and 14, and thus hold them away from the cam-plate. When in this position, the oscillations of the steam-lever and the movements of the shield-plate have no effect on the particular valve. Each steam-lever is provided with an elongated hub 32 or other suitable spacing device, and the end of one hub engages with the adjacent steam-lever. In this way the parts are prevented from moving longitudinally on the shaft 20. Loosely mounted on the hub 32 is a cam-plate 15, Fig. 9. This is provided with a cam-slot to receive the pin 30 and its surrounding antifriction-roller. It is also provided with two projections 33 and 34. These projections are designed to engage with the dogs 13 and 14, respectively, when it is desired to open or close the valve. The dogs 13 and 14, as well as the projections 33 and 34, are hardened to prevent excessive wear. The cam-plate is also provided with notches 35 to receive a projection carried upon a flat spring 36, Fig. 4, to lock the cam-plate in one or the other of its positions. The cam-plate is provided with a hub 37, that is adapted to receive the shield-plate 16. In the illustration Fig. 8 the shield-plate is made in the form of a bell-crank lever; but it can be changed as desired. The shield-plates are set in the required positions and are afterward clamped together for simultaneous movement. The portion 38, that engages with the dogs, and the portion 39, that is connected to the rod extending to the governor, bear a fixed relation to each other; but I may make them adjustable, if desired. In Fig. 12 I have shown the lower end 39 of the shield-plate enlarged, with a number of holes 40 contained therein, so that the point of connection between the rod 17 and the lever can be changed to adjust the mechanism.

Referring again to Figs. 3 and 4, a number of cam-plates are provided and an equal number of shield-plates. The shield-plates are stepped one behind the other, as clearly shown in Fig. 4, so that the valves will operate successively. In other words, if all of the shield-plates were in the same plane all of the valves would open or close simultaneously. It is within the scope of my invention to operate two or more of these valves in the same stage simultaneously; but I prefer to operate them successively in order to obtain close regulation of the turbine. It is preferable to provide each valve with its own actuating mechanism; but, if desired, I may couple two or more of the valves to the same actuating mechanism. Assuming a shield-plate to be held in the position shown in Fig. 4 by the governor, the lever 11 will be oscillated or rocked to and fro by the connecting-rod 10. This in turn imparts movement to the steam-lever 12. The position of the shield-plate is such that it prevents the upper dog 13 from engaging with the projection 33, and so long as this relation is maintained the cam-plate and valve will stay in the position shown. The lower dog 14, while it is shown in engagement with the projection 34, has no effect thereon, because it has moved the cam-plate to the end of its stroke.

In Fig. 5 the cam-plate 15 has been shifted by the upper dog 13, so that the valve is closed. The shield-plate 16 is held in such a position by the governor that the lower dog 14 is prevented from engaging with and moving the cam-plate.

In Fig. 6 is shown a view somewhat similar to that in Fig. 4, except that the upper dog 13 is shown at the end of its stroke and the lower dog 14 is held in a raised position by the shield-plate 16.

In Fig. 7 a condition similar to that of Fig. 5 is shown, except that the shield-plate 16 is in engagement with the lip formed on the upper dog 13, and the lower dog 14 is shown resting upon the smooth surface of the cam-plate 15, where it can have no effect.

In Fig. 11 is shown a dog 13, together with the means employed to attach it to the steam-lever 12. The dog is provided with a lip or projection 41, that engages with the end of a shield-plate. The dog is counterbored to receive the head of the stud 42, that passes through the steam-lever 12.

The dogs and shield-plates may be so arranged that when the latter occupies a central or neutral position that first one dog and then the other will actuate the cam-plate, and thus open and close the valve. In this way one valve of a series will be opening and closing a certain limited number of times per minute. In this connection it should be noted that this action may take place without any change in position of the speed-governor. In other words, the speed remains unchanged; but there may be a constant opening and closing of one or more valves, depending upon the arrangement.

Referring to Figs. 13 to 16, I show my invention applied to a vertical turbine-generator set, wherein 45 represents the turbine, which is mounted on a suitable base 46, the latter being provided with openings, whereby it may be connected to a condenser or to atmospheric exhaust. Situated above the turbine and mounted upon a stool 47 is a generator 48. The generator is provided with a cover 49, which carries a dome 50. Mounted within the dome is an extension-spring governor, having weights 51 and an extension-spring 52. The motion of the spring and weights is transmitted to the lever 53, the latter being pivoted at 54 on projections on the dome. The left-hand end of the lever is attached to a spring 55, that is used for synchronizing. In other words, this spring is employed to change the speed of the turbine when it is desired to operate it in parallel with other turbines. The spring also serves to balance the lever and attached parts. In order to change the tension of the spring 55 when the turbine is running, an electric motor 56 is provided that is supported by the dome. The shaft of the motor is provided with a worm that meshes with a worm-wheel 57, the latter acting on a nut for changing the tension of the spring. At the end of the governor-actuated lever 53 is an adjustable rod 58, which is attached to the shield-plates 59. Mounted on the end of the turbine-shaft adjacent to the governor is the gear 60, meshing with a corresponding gear 61. These gears are preferably of the spiral type, although plain spur-gears may be employed where the speed of the turbine is relatively low. The gear 61 is mounted upon the shaft 62, the latter being provided with a worm 63, meshing with a worm-wheel. The worm-wheel is mounted on a shaft that is provided with a crank-pin 64. This crank-pin imparts a rocking motion to the steam-levers 65 by means of the connecting-rod 66, rocking-levers 67, and connecting-rod 68. The connecting-rods are both provided with means for taking up the wear and also for adjusting the length. Steam or other elastic fluid is supplied to the turbine by the conduit 69, which discharges into the valve-chest 70. The valve-chest is provided with a vertical portion that forms a frame or support for the valve-actuating mechanism.

Referring to Figs. 15 and 16, the construction of the valve-actuating mechanism will be described. 65 represents a lever for rocking the steam-levers and which may have from one hundred to one hundred and thirty-five strokes per minute. I do not limit myself to this, however. The lever is mounted upon the rock-shaft 71, that is carried by bearings 72, Fig. 14, in a bracket located on top of the valve-chest. Upon this rock-shaft are mounted the shield-plates 59, the cam-plates 73, and steam-actuated levers. Each cam-plate, in addition to moving a valve 74, is provided with notches to receive the antifriction-roller carried by the end of the detent-lever 75. The function of these notches and the detent-lever is to hold the cam-plate in definite positions, one corresponding to the closed position of the valve, the other to the open position of the valve. The detent-lever is mounted upon a cross-head 76, which moves in vertical guides on the face of the support 70. The end of the detent-lever 75 is normally held in engagement with one notch or the other in the cam-plate by the compression-spring 77. Each valve is provided with an adjustable stem 78 and a head 79, located in the cylindrical bore or opening in the cross-head. Between the head of the valve-stem and the bottom of the bore or opening is a stiff compression-spring 80, which compensates for unequal expansion of the parts and also for any inaccuracies in workmanship. At the point where the valve-stem passes through the wall of the valve-chest is provided a detachable sleeve 81, which contains a suitable packing and adjusting gland 82. The seat 83 for the valve is detachable, and its diameter being somewhat smaller than that of the sleeve 81 it can be renewed by first removing the sleeve 81. Steam or other elastic fluid entering from the conduit 69 passes through one or more valved openings into the passage 84, the latter supplying motive fluid to one or more sections of a sectionalized nozzle 85. This nozzle may be of the expanding or non-expanding type, as desired. Situated below the nozzle is a bucket-wheel 86, having two rows of buckets. Between the rows of wheel-buckets is a more or less complete row of stationary or intermediate buckets 87, that receive steam from one row of wheel-buckets and after changing its direction discharge it against the other row.

Referring to Fig. 14, 53 represents the lever that is actuated by the governor, and 58 the rod that connects it with the shield-plates 59. To insure corresponding movements of the shield-plates, they are rigidly connected together by a rod or equivalent means 88. On referring to Figs. 14 and 15 it will be seen that the valves and other actuating mechanism, excluding the rods 58 and 68, are carried by a common support and can be removed or mounted on the turbine as a unit, and this without in any way interfering with the alinement. This is a very desirable feature, since it reduces to a minimum the liability of the parts being out of adjustment. Moreover, each valve and its actuating mechanism is separate, as described in connection with the previous figures, and one valve and its actuating mechanism is the counterpart of every other valve and its actuating mechanism. If trouble should occur with one of the valves, it can be cut out of service without in any way affecting the action of the other valve or valves.

In Fig. 16 the parts are shown in a position to close the valve. 65 represents a lever moving in unison with the steam-lever and which is continually rocked by the rod 68 and attached gearing. 59 is the shield-plate that controls the action of the dogs 89 and 90. The dog 89 moves the cam-plate 73 in one direction, while the dog 90 moves it in the opposite. The shield-plate 59 controls their action in exactly the same manner as described in connection with the previous figures. In this case, as before, a single spring 91 is employed to hold the dogs against the cam-plate 73, subject to the action of the shield-plate. The cam-plate is cut away to receive the wearing-blocks 92, which engage with the dogs and are hardened to prevent excessive wear. When the parts become worn, it is a simple matter to replace the dogs and the wearing-blocks. The rock-shaft 71, cam-plates, shield-plates, and steam-levers and cross-heads 76 being carried by a bracket can be removed from the support 70 as a unit after the valve-stems 78 are detached from the cross-heads.

In Fig. 17 I have shown my invention in connection with a multistage vertical turbine of the Curtis type. Only two stages are shown; but it is to be understood that the invention is applicable to machines having a greater number of stages, some or all of which are provided with my improved valve mechanism. All of the passages admitting fluid from one stage to the next may be valved, or a less number. I may use the same number of governor-controlled automatic valves as there are passages, or I may use pressure-actuated or other automatic valves for some of the passages, and hand or power actuated valves for the remaining passages. In other words, those passages not directly under the control of the governor may be valved or not, as will best suit the conditions of operation. Owing to the fact that the load of the turbine does not ordinarily vary from zero to maximum, it will generally be unnecessary to valve all of the passages. Each stage is provided with as many valves as are necessary to satisfactorily control the passage of motive fluid. Each valve and its actuating mechanism is of the type heretofore described, so detailed description is unnecessary. The lever 65, that is rigidly connected to the rocking shaft 71, is actuated by the connecting-rod 68, as before. The rocking shaft 101 of the second-stage-valve mechanism is actuated by the lever 93, and the latter is connected to the lever 65 by an adjustable connecting-rod 95. Where more than two stages are to be valved, a connection-rod 100 is employed to transmit motion from the connecting-rod 68 to the succeeding rocking shafts. Mounted on the rocking shaft 101 is a shield-plate 92, which is connected with the shield-plate 59 through an adjustable connecting-rod 94. The second-stage shield-plate may be connected to that of a third stage by the adjustable rod 99. As many shield-plates are provided as there are valves, and each plate controls the operation of the dogs 96 97. The valves are mounted in a valve-chest 105, which is bolted to the side of the turbine-casing, and each valve controls the passage of fluid from the conduit 102 to the conduit 103, the latter discharging into the nozzle or fluid-discharging device 104. Each one of these conduits may discharge into one or more nozzle-sections or fluid-discharging devices. Each of the second-stage valves is actuated by a cam-plate 98 in the manner previously described. With the mechanism arranged as described when a valve of original admission is opened or closed by a steam-lever a corresponding stage-valve is opened or closed. When the shield-plate for the first-stage valve is in a given position the shield-plates for the corresponding second and succeeding stage valves, where such valves are employed, are in a corresponding position. I have spoken of having the admission-valve and the stage valve or valves corresponding therewith opened and closed simultaneously; but under certain conditions one of these valves may open slightly in advance of the other. This can readily be brought about by the adjustment of the parts. Instead of using separate valve-actuating mechanism for the succeeding stage-valves after the first, I may provide one set of actuating devices and connect thereto as many valves as is desired, the separate valves controlling the passage of fluid in different stages. These actuating devices may be located at one end or on the side of the machine, as desired. Where the corresponding valves in the different stages are alined, the valves may all be mounted on the same stem, as shown in Fig. 18. This arrangement is advantageous where the space between stages is small, or where the overall dimensions of the machine are restricted.

Referring to Figs. 19 and 20, 110 represents one steam-chest containing valves of original admission, and 111 a similar chest located on the opposite side of the turbine or at any suitable point. The valve mechanisms in both sets are identical; but under certain conditions the parts of one set may be right-handed and those in the other left-handed. Obviously, however, it is better practice to make the parts alike and to provide suitable connecting devices between them and the governor, so that the motion of one is reversed with respect to the other. This is the arrangement shown in the figures. The cams and other means for actuating the valves in the right-hand chest are mounted on the rock-shaft 112, and those for the left-hand chest on the rock-shaft 113. The rock-shaft 112 is provided with an arm 114, and the rock-shaft 113 with an arm 115. These arms are connected by rods 116 and 117 with bell-crank levers 118 and 119, which are mounted in brackets located on the casing of the generator or other suitable support. The bell-crank levers are in turn connected to a common source of power, which in the present instance comprises a crank 120, Fig. 20, driven by suitable speed-reducing gearing from the turbine-shaft. As the crank rotates it rocks the shafts 112 and 113. Each set of valves is provided with the necessary number of shield-plates, and the latter are properly set and connected, so as to be operated by the governor. The lever 121 for actuating the right-hand set of shield-plates is connected by the adjustable rod 122 with the bell-crank lever 123, the latter being connected by an adjustable rod 124 with the lever 125, actuated by the speed-responsive device or other governor. The lever 126 is employed for actuating the left-hand set of shield-plates, and instead of being connected directly to the governor-actuated lever 125 through the adjustable rods 127 and 128 and the bell-crank lever 129 a motion-reversing lever 130 is provided in said connection. Without this or an equivalent arrangement the shield-plates in one set would move in a clockwise direction, while those in the other set would move in an anticlockwise direction—that is, assuming that similar parts are used in each set. Where dissimilar and properly-arranged parts are used, the reversing-lever 130 or its equivalent may be dispensed with. The parts may be so set that all of the valves in the right-hand set are operated and then those in the left, or the parts may be so arranged that a valve in one set of valves opens or closes and then a valve in the other set. Under sudden changes in load two or more valves may operate simultaneously, but ordinarily one valve will operate after the other both in opening and closing.

In accordance with the provisions of the patent statutes I have described the principle of operation of my invention, together with the apparatus which I now consider to be the best embodiment thereof; but I desire to have it understood that the apparatus shown is only illustrative and that the invention can be carried out by other means.

What I claim as new, and desire to secure by Letters Patent of the United States, is—

1. In a governing mechanism for turbines, the combination of a valve which has an open and a closed position but no intermediate, a motor which has a to-and-fro movement and by a single stroke in one direction opens the valve and by a reverse stroke closes it, a governor, and a means controlled by the governor for connecting and disconnecting the motor and valve.

2. In a governing mechanism for turbines, the combination of a valve which has an open and a closed position but no intermediate, an actuator for the valve, a motor which has a continuous to-and-fro movement, a speed-responsive device, and a means controlled by said device for connecting and disconnecting the motor and valve-actuator.

3. In a governing mechanism for a turbine, the combination of a device responsive to load changes, a valve having an open and a closed position but no intermediate, a constantly-moving motor, and a means under the control of the load-responsive device which causes the said motor to positively move the valve either to its open or closed position.

4. In a governing mechanism for a turbine, the combination of a device responsive to load changes, a valve which has an open and closed position but no intermediate, an actuator therefor, a motor or driving means which moves to and fro with respect to the actuator and by a single stroke in one direction opens the valve and by a reverse stroke closes it, and a means under the control of the load-responsive device, which connects and disconnects the actuator and motor as the load changes.

5. In a governing mechanism for turbines, the combination of a driving means which has a definite stroke to and fro over a given distance, a valve, an actuator for the valve, the length of movement of which corresponds to that of the driving means, and a governor-controlled means which connects and disconnects the driving means and actuator as the load on the turbine varies.

6. In a governing mechanism, the combination of a valve, a valve-actuator, a lever, pivotally-supported dogs carried by the lever arranged to engage the actuator, a governor, and means actuated by the governor for permitting the dogs to transmit motion from the lever to the actuator.

7. In a governing mechanism for turbines, the combination of a plurality of valves, motors for actuating the valves which have a to-and-fro movement, a governor common to the motors, and a means for each motor, that is under the control of the governor, for connecting and disconnecting the valves and motors in a predetermined manner as the load on the turbines change.

8. In a governing mechanism for turbines, the combination of a plurality of valves, motors for actuating the valves, a speed-governor common to the motors, and means under the control of the governor for connecting the valves with the motors or permitting the latter to move without moving the valves, the said means being differently adjusted or arranged so that the valves will operate successively both in opening and closing.

9. In a governing mechanism for turbines, the combination of a valve, a cam-plate for moving the valve, a motor for actuating it, a motor which moves to and fro, dogs on the motor adapted to engage the cam-plate, a shield-plate for controlling the engagement of the dogs with the cam-plate, and a governor for moving the shield-plate.

10. In a governing mechanism, for turbines, the combination of a plurality of valves, a plurality of cam-plates for actuating the valves, motors for moving the cam-plates, dogs on the motors adapted to engage the cam-plates, shield-plates controlling the action of the dogs on the cam-plate, and a governor which controls the movements of the shield-plates.

11. In a governing mechanism for turbines, the combination of a valve-chest, a valve therein, a cross-head for the valve, a cam-plate acting through the cross-head to move the valve, a motor having a to-and-fro movement, dogs actuated by the motor which are adapted to engage the cam-plate, and a governor-controlling device which determines which dog or either of them shall engage the cam-plate.

12. In a governing mechanism for turbines, the combination of a valve-chest, a valve therein, a motor having a continuous to-and-fro movement, a dog for opening the valve which is moved by the motor, a second dog also moved by the motor for closing the valve, and a governor-controlled means which in one position permits one dog to move the valve, in another position permits another dog to move the valve, and when in a neutral position permits both dogs to act alternately upon the valve.

13. In a governing mechanism for turbines, the combination of a plurality of valves, a plurality of continuously-acting motors which derive their motion from the same source, dogs moved by the motors to open or close the valves, and a governor-controlled means which engages the dogs and permits them to open all of the valves or to close them, or to keep part of them open and the remainder closed.

14. In a governing mechanism for turbines, the combination of a plurality of valves, a plurality of continuously-operating motors for actuating the valves, a yielding medium included between each valve and its motor for compensating purposes, and a governor-controlled means for connecting and disconnecting the motors from the valves.

15. In a governing mechanism for turbines, the combination of a valve, a cam-plate mounted to turn about an axis for actuating the valve, a lever mounted to turn about the same axis, means on the lever for transmitting motion to the cam-plate, and a shield-plate also mounted to turn about the same axis to control the action of the dogs.

16. In a governing mechanism for turbines, the combination of a plurality of valves, with a steam-lever, cam-plate and shield-plate for each valve, and a governor which moves all of the shield-plates.

17. In a governing mechanism for turbines, the combination of a plurality of valves, with a steam-lever, cam-plate and shield-plate for each valve, a shaft which is common to said levers and plates, and a governor which moves all of the shield-plates.

18. In a governing mechanism for turbines, the combination of a valve-chest, a plurality of valves, an extension on the chest, a cross-head for each valve guided by the extension, an individual actuator for each valve that is carried by the extension, and a governor-controlled means for regulating the action of the motors, that is also carried by the extension.

19. In a governing mechanism for turbines, the combination of a valve, an actuator therefor which has a to-and-fro movement and is driven by the turbine itself, pivotally-supported dogs interposed between the valve and actuator for transmitting motion from the actuator to the valve, a governor, and a means under the control of the governor for connecting and disconnecting the valve and actuator through the intermediary of the pivoted dogs.

20. In a governing mechanism for turbines, the combination of a plurality of valves, an actuator for each valve, a driving connection from the turbine imparting to-and-fro movements to the actuator, and a governor-controlled device which connects and disconnects the valves and actuators without interfering with the to-and-fro motion of the latter.

21. In a governing mechanism for turbines, the combination of a plurality of valves, a separate actuator for each valve, that has a continuous to-and-fro movement, a driving connection between the turbine-shaft and the actuators that is in operation at all times and a governor-controlled device for each valve that renders its actuator operative or inoperative to meet the conditions of service.

22. In a governing mechanism for turbines, the combination of a plurality of valves, actuating mechanism for the valves which is continuously moved to and fro, and a governor-controlled means which connects and disconnects the valves and the actuating mechanism to meet the requirements for motive fluid.

23. In a governing mechanism for turbines, the combination of a valve, a cam for moving the valve, a lock for holding the cam in definite positions, an actuator which is continuously in operation, and a means for connecting and disconnecting the cam and actuator.

24. In a governing mechanism for turbines, the combination of a valve, a pivoted cam for moving the valve, a lock for holding the cam in definite positions, a cross-head for the valve, and an actuator for the cam.

25. In a governing mechanism for turbines, the combination of a valve, a shaft mounted at right angles to the axis of the valve, a cam mounted thereon for moving the valve toward and away from the spindle, an actuator, dogs on the actuator for rocking the cam in one direction or the other, and a governor which determines which, if either, of the dogs shall operate.

26. In a governing mechanism, the combination of a valve, a shaft, a cam mounted thereon for rocking movement, a notch formed in the cam to act as a lock, a detent-lever adapted for engagement with the notch, and a governor controlling the action of the cam.

27. In a governing mechanism, the combination of a valve, a cross-head mounted on the valve-stem, a rocking cam for moving the valve through the cross-head, and a lock for the cam carried by the cross-head.

28. In a governing mechanism, the combination of a valve-chest, a plurality of valves mounted therein, actuators for the valves mounted on a shaft, a detachable support for the spindle mounted on the valve-chest, and means for imparting motion to the actuators.

29. In a governing mechanism, the combination of a plurality of valves mounted in a chest, an actuator for each valve, a shaft upon which the actuators are mounted, a bracket for carrying the shaft which is mounted on the valve-chest, and a yielding medium between each valve and its actuator.

30. In a governing mechanism, the combination of a plurality of valves mounted in a chest, an actuator for each valve, a shaft upon which the actuators are mounted, a bracket for carrying the shaft which is mounted on the valve-chest, a cross-head for each valve, and locks carried by the cross-heads for holding the actuators in predetermined positions.

31. In a governing mechanism, the combination of a valve-chest, a valve mounted therein, an actuator for the valve, a bracket supporting the actuator which is carried by the valve-chest, and a cross-head for the valve working in guides on the valve-chest.

32. In a governing mechanism for turbines, the combination of a plurality of valves, an actuator therefor which has a to-and-fro movement, a speed-reducing connection between the turbine-shaft and the actuator, a speed-responsive device, a means for controlling the action of the actuators, a connection between the speed-responsive device and said means, and a spring for counterbalancing the weight of the connection and changing the speed of the turbine.

33. In a governing mechanism for turbines, the combination of a speed-reducing gearing, a crank operated thereby, an actuator which is given a to-and-fro motion by the crank, a valve opened and closed by the actuator, a governor, and a means under the control of the governor for causing the actuator to engage or be disengaged from the valve.

34. In a governing mechanism for turbines, the combination of a shaft, a steam-lever mounted thereon, a lever for rocking the shaft, a cam-plate loosely mounted on the shaft, and a shield-plate also loosely mounted on the shaft.

35. In a governing mechanism for turbines, the combination of a shaft, a steam-lever mounted thereon, a means for rocking the shaft, a cam-plate loosely mounted on the shaft, spring-pressed dogs carried by the steam-lever for actuating the cam-plate, and a means for controlling the action of the dogs.

36. In a governing mechanism for turbines, the combination of an admission-valve, a rock-shaft for opening and closing it, means for connecting and disconnecting the valve and rock-shaft, a crank driven by the turbine, and a connecting-rod between the rock-shaft and crank.

37. In a governing mechanism for turbines, the combination of a plurality of admission-valves, a motor, actuators for transmitting motion from the motor to the valves, a governor-controlled means for rendering the actuators operative or inoperative with respect to the valves, and a device for cutting a valve out of service in case of trouble without disturbing the action of the remaining valves and their actuating mechanism.

38. An elastic-fluid turbine operating by stages to abstract energy from the motive fluid, in combination with a valve controlling the admission of motive fluid to the first stage, a valve controlling the admission of fluid to a subsequent stage, a constantly-operating motor for opening and closing the admission and stage valves, a governor, and a means under the control of the governor for positively connecting and disconnecting the valves and motor.

39. An elastic-fluid turbine operating by stages to abstract the energy from the motive fluid, in combination with a valve controlling the admission of motive fluid to the first stage, a valve controlling the admission of fluid to a subsequent stage, a motor having a constant to-and-fro movement for opening and closing the admission and stage valves, a means intermediate the motor and valves for positively transmitting motion from the former to the latter, a speed-governor, and a device actuated by the governor for rendering the means active or inactive.

40. An elastic-fluid turbine, in combination with a plurality of valves controlling the admission of motive fluid to the first stage, a plurality of valves controlling the passage of motive fluid from one stage to the next, a constantly-running motor which operates the valves, a separate means for positively connecting each valve to the motor when it is desired to move it, a governor, and a device under the control of the governor, which determines the operative relation between the motor and the connecting means of the valves of different stages.

41. An elastic-fluid turbine, in combination with a plurality of valves controlling the admission of motive fluid to the first stage, and also to a succeeding stage or stages, a reciprocating motor which moves the valves, actuating-dogs for each valve that derive their motion from the motor, a governor, and a shield-plate for each of the valves which controls the operation of the dogs.

42. A turbine which is divided into two or more stages, in combination with a valve for each stage controlling the admission of motive fluid thereto, a steam-lever for each valve, a motor for actuating all of the levers for opening and closing the valves, a speed-responsive device, and a shield-plate for controlling the action of each said means which is moved by the speed-responsive device.

43. A multistage turbine, in combination with a valve mechanism for two or more stages, a motor for actuating the valve mechanism of the first stage, a connecting-rod for transmitting motion from one valve mechanism to the other, a means for regulating the action of the motor on each valve mechanism, a governor connected to the first-stage means, and a connecting-rod between the said first-stage means and the next.

44. In an elastic-fluid turbine operating by stages, the combination of a plurality of successively-operating valves for each stage, that control the admission of motive fluid thereto, a rock-shaft for operating the valves of each stage, a connecting-rod for transmitting motion from the turbine-shaft to one of the rock-shafts, and means sensitive to speed changes for connecting or disconnecting the rock-shafts and valves, to meet the demand for motive fluid.

45. In a governing mechanism for turbines, the combination of a governor, a valve located in a given position on the turbine, a second valve located in a different position, means for actuating the valves, and a shield-plate for controlling each valve which is connected to and moved by the governor.

46. In a governing mechanism for turbines, the combination of a governor, a valve located in a given position on the turbine, a second valve located in a different position, means for actuating the valves, a device actuated by the governor for controlling one valve, a second device also actuated by the governor for controlling another valve, and a motion-reversing means included in the second device.

47. In a governing mechanism for turbines, the combination of a governor, sets of counterpart valves located in different positions for controlling the turbine, actuators for the valves, separate means for regulating the action of the actuators, which are controlled by the governor, and a reversing device included in one of the said means.

48. In a governing mechanism, the combination of a valve, an actuator therefor which is constantly in motion, a driving and speed-reducing connection between the shaft of the engine being governed and the actuator, which comprises a gear driven by the shaft, a driven gear meshing with the first, a shaft for the driven gear, a worm thereon, a worm-wheel, a crank driven by the worm-wheel and connected to the actuator, and a device responding to load changes for controlling the effect of the actuator on the valve.

In witness whereof I have hereunto set my hand this 7th day of December, 1904.

RICHARD H. RICE

Witnesses:
 ALEX. F. MACDONALD
 HELEN ORFORD.